(No Model.)
E. WESTON.
TEMPERATURE REGULATING DEVICE FOR ELECTRICAL CIRCUITS.
No. 480,891. Patented Aug. 16, 1892.
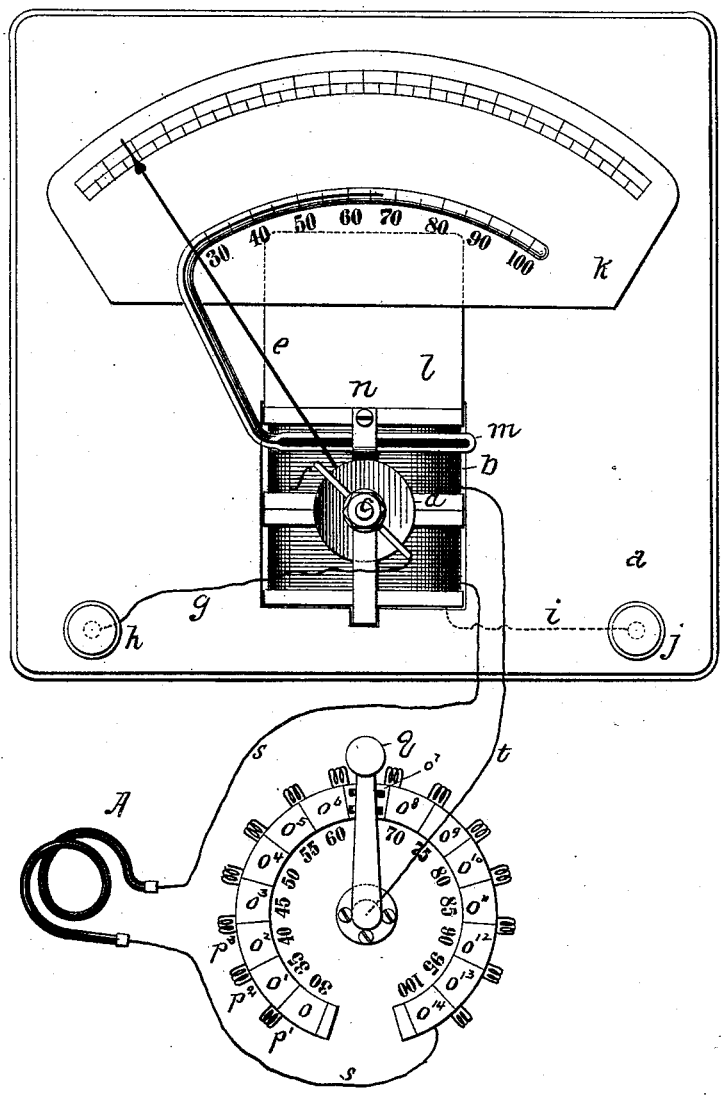
WITNESSES:
INVENTOR
Edward Weston
BY Park Benjamin
his ATTORNEY.

UNITED STATES PATENT OFFICE.

EDWARD WESTON, OF NEWARK, NEW JERSEY.

TEMPERATURE-REGULATING DEVICE FOR ELECTRICAL CIRCUITS.

SPECIFICATION forming part of Letters Patent No. 480,891, dated August 16, 1892.

Application filed June 4, 1891. Serial No. 395,135. (No model.)

*To all whom it may concern:*

Be it known that I, EDWARD WESTON, of Newark, Essex county, New Jersey, have invented a new and useful Improvement in Temperature-Regulating Devices for Electrical Circuits, of which the following is a specification.

My invention relates to a device for maintaining constant electrical resistance in a circuit despite changes in temperature occurring in said circuit and due to thermometric variations in the surrounding atmosphere; and my invention consists in the combination, with a coil producing a field of force in an electrical measuring-instrument, the said coil being formed of an electrical conductor the resistance of which increases with augmented temperature, of a conductor connected in series with said coil, the resistance of which decreases with augmented temperature, the said coil and circuit connections and the said last-named conductor being relatively proportioned and arranged to render their combined resistance substantially constant despite temperature changes.

The accompanying drawing shows a plan view of an electrical instrument to which my temperature-regulating device is applied.

In Letters Patent No. 440,290, granted to me November 11, 1890, I have fully described and claimed the instrument here shown, to which my present invention is applied, and also the particular means of maintaining constant electrical resistance in the circuit of the instrument despite changes of temperature occurring in said circuit, said changes being principally those due to the heating effect of the current upon its conductor. I will therefore describe said instrument here only briefly, referring to my aforesaid patent for the complete details of its construction and use.

$a$ is the base-board, which carries the fixed coil $b$ of insulated wire. Within this coil there is a pivoted coil, (not shown,) the pivot-shaft $c$ of which carries a disk $d$, which supports the index or pointer $e$. The bar $f$ is a tightening-bar for a spiral spring, (not shown,) which surrounds the coil-pivot. One end of the said bar $f$ is connected to the circuit-wire $g$, which leads to the binding-post $h$. The circuit in the instrument proceeds from the binding-post $h$ to bar $f$ to the coiled spring, to which said bar is connected, thence to the inner pivoted coil, (not shown,) thence to a second coiled spring and to the fixed coil $b$, and thence by wire $i$ to the binding-post $j$.

$k$ is a scale-plate, over which the index is moved. The coil $b$ and movable coil therein are electrically connected, and when a current traverses them the pivoted coil assumes a position dependent upon the difference of potential between the terminals of the instrument, and the index is thus moved over the suitably-marked scale.

$m$ is a thermometer-bulb curved and fastened upon the exterior of the coil $b$ by a strap $n$. By means of the thermometer-tube disposed upon the scale-plate, as shown, the temperature of the coil is shown.

At $p'\ p^2\ p^3$, &c., is a series of resistances, over which moves the contact-arm $q$, and this device is interposed (in wire $s$) in the circuit of the fixed coil $b$. The contact-plates $o\ o$, &c., are marked to correspond to the thermometer-scale. When the arm $q$ is placed on the contact-plate $o$, it will be evident that the current in the instrument then passes through all the resistances $p'\ p^2\ p^3$, &c. Let it be supposed, merely for purposes of illustration, that this is the starting-point of temperatures. Now suppose the heat of the coil augments, so that the thermometer shows a temperature of 65°. In order to compensate for the consequent increase of resistance in the coil, the switch-arm $q$ is moved around to meet the plate $o^7$. (Marked 65.) Seven resistances $p'\ p^2$, &c., will thus be thrown out of the circuit, and as each resistance corresponds to the increase of resistance in the coil, due to the elevation of five degrees of temperature, it follows that by throwing out seven of these resistances we have exactly compensated for the increased resistance of the coil, due to its augmented heat, so that it is simply necessary with this device to note the indication of the thermometer and place the arm $q$ on the contact-plate marked correspondingly to that indication to keep the resistance of the circuit in the instrument uniform.

The foregoing device I find in practice to answer well for maintaining a constant resistance in the circuit, despite changes of temperature in the latter, due to the heating effect of the current. It is desirable, however, to compensate not merely for these changes, but also for changes occurring in the circuit by reason of thermometric variations in the surrounding atmosphere. To this end I interpose in the circuit of the fixed coil $b$ a body A of carbon or other material which possesses the property of offering a diminished resistance on being increased in temperature. This body of carbon I proportion or arrange so that for a given thermometric variation in the atmosphere it will vary in resistance inversely to the change produced by the same cause in the remainder of the instrument-circuit; or, in other words, if the resistance in the rest of the circuit increases the resistance in the body of carbon A decreases, and vice versa. In practice I prefer to use a thin filament of carbon, which, by means of copper electro-deposition or in various other known ways, can easily be connected directly in the instrument-circuit.

It will be obvious that the introduction of this body of carbon A, if properly proportioned, while compensating for variations in resistance of the circuit, due to changes in temperature in the surrounding atmosphere, does not interfere practically with the operation of the thermometer and resistance-coils applied to the instrument and which serves as means for compensating for changes in resistance, due to variations in the heating effect of the current.

I claim—

1. In an electrical measuring-instrument, a coil producing a field of force in said instrument and formed of an electrical conductor the resistance of which increases with augmented temperature and connected in series with said coil, a conductor the resistance of which decreases with augmented temperature, the said coil and circuit connections and the said last-named conductor being relatively proportioned and arranged to render their combined resistance substantially constant despite temperature changes.

2. In an electrical measuring-instrument, a coil producing a field of force in said instrument and formed of an electrical conductor the resistance of which increases with augmented temperature, and a strip of carbon connected in series with said coil, the said coil and circuit connections and the said carbon being relatively proportioned and arranged to render their combined resistance constant despite temperature changes.

3. In an electrical measuring-instrument, a metallic coil producing a field of force in said instrument and in series connection therewith, an electrical conductor the resistance of which decreases with augmented temperature, the said conductor being freely exposed to the atmosphere and the said coil and circuit connections and conductor being relatively proportioned and arranged to render their combined resistance constant despite changes in atmospheric temperature.

4. In combination with an electrical measuring-instrument containing in circuit a fixed coil and a movable coil moving in the field of said fixed coil, both of said coils being made of an electrical conductor the resistance of which increases with augmented temperature, an electrical conductor the resistance of which decreases with augmented temperature connected in series with said coils, the said coils and circuit connections and the said last-named conductor being relatively proportioned and arranged to render their combined resistance substantially constant despite temperature changes.

5. In an electrical measuring-instrument, a means of indicating changes in temperature occurring in the instrument-circuit and connected in said circuit, a resistance, and a means of varying the same conformably to the indications of said heat-indicating apparatus, in combination with an electrical conductor interposed in said circuit, the electrical resistance of which conductor decreases with augmented temperature, whereby the resistance of the whole circuit may be maintained constant despite both internal and external temperature variations.

6. In an electrical measuring-instrument, a coil, a means of indicating variations in the temperature of said coil and in circuit with said coil, a variable resistance, and an electrical conductor the resistance of which decreases with augmented temperature.

EDWARD WESTON.

Witnesses:
M. BOSCH,
J. E. GREER.